(12) United States Patent
Pang et al.

(10) Patent No.: US 11,460,689 B2
(45) Date of Patent: Oct. 4, 2022

(54) SYSTEM AND METHOD FOR ASSOCIATION ASSISTED ESTABLISHMENT OF SCATTERING CONFIGURATION IN SCATTERING PROCESSING

(71) Applicants: Stanley Electric Co., Ltd., Tokyo (JP); LinOptx, LLC, San Diego, CA (US)

(72) Inventors: Lin Pang, San Diego, CA (US); Tomofumi Yamamuro, San Diego, CA (US)

(73) Assignees: STANLEY ELECTRIC CO., LTD., Tokyo (JP); LINOPTX, LLC, San Diego, CA (US)

(\*) Notice: Subject to any disclaimer, the term of this patent is extended or adjusted under 35 U.S.C. 154(b) by 518 days.

(21) Appl. No.: 16/708,822

(22) Filed: Dec. 10, 2019

(65) Prior Publication Data

US 2020/0241385 A1 Jul. 30, 2020

Related U.S. Application Data

(60) Provisional application No. 62/797,363, filed on Jan. 28, 2019, provisional application No. 62/797,366, filed on Jan. 28, 2019.

(51) Int. Cl.
*G01S 17/88* (2006.01)
*G02B 26/08* (2006.01)
(Continued)

(52) U.S. Cl.
CPC ....... *G02B 26/0833* (2013.01); *B60Q 1/1407* (2013.01); *B60Q 1/1423* (2013.01);
(Continued)

(58) Field of Classification Search
CPC .......... G01S 17/89; G01S 17/88; G01S 17/04; G01S 7/497; G01S 17/06; G02F 1/00; G02F 1/01; G02F 2/00; G02F 2/02
(Continued)

(56) References Cited

U.S. PATENT DOCUMENTS

| | | | |
|---|---|---|---|
| 7,075,055 B2 * | 7/2006 | Nagai | G01R 33/032 356/369 |
| 2015/0009695 A1 | 1/2015 | Christmas et al. | |
| 2018/0302542 A1 | 10/2018 | Masumura | |

FOREIGN PATENT DOCUMENTS

| | | |
|---|---|---|
| JP | 2019-027974 A | 2/2019 |
| JP | 2019-092088 A | 6/2019 |

OTHER PUBLICATIONS

Extended European search report dated Mar. 23, 2021, in corresponding European patent Application No. 20212289.1, 8 pages.

\* cited by examiner

*Primary Examiner* — Que Tan Le
(74) *Attorney, Agent, or Firm* — Xsensus LLP

(57) ABSTRACT

A system for association-based scattering processing includes a spatial light modulator configured to modulate one or more of phase and amplitude of light irradiated from a light source to a target object. Additionally, the system includes processing circuitry configured to evaluate a field distribution for one localized illumination, induce a set of field distributions for a plurality of localized illuminations based on the field distribution for the one localized illumination, and apply the set of field distributions to the spatial light modulator, scanning a plurality of localized illuminations on the target object.

20 Claims, 14 Drawing Sheets

(51) Int. Cl.
*G02F 1/01* (2006.01)
*F21S 41/16* (2018.01)
*F21S 41/125* (2018.01)
*F21S 41/60* (2018.01)
*F21V 9/30* (2018.01)
*B60Q 1/14* (2006.01)
*F21V 9/08* (2018.01)
*F21V 9/14* (2006.01)
*F21V 14/00* (2018.01)
*H04N 5/225* (2006.01)
*G01S 17/04* (2020.01)
*B60Q 1/20* (2006.01)
*G01N 21/47* (2006.01)
*G01S 17/10* (2020.01)
*H04N 5/272* (2006.01)
*G01S 17/89* (2020.01)
*G01S 17/931* (2020.01)
*G01S 7/497* (2006.01)
*G03B 21/00* (2006.01)
*F21Y 115/30* (2016.01)
*F21Y 115/10* (2016.01)
*F21W 102/20* (2018.01)
*G01J 3/28* (2006.01)

(52) U.S. Cl.
CPC .............. *B60Q 1/20* (2013.01); *F21S 41/125* (2018.01); *F21S 41/16* (2018.01); *F21S 41/60* (2018.01); *F21V 9/08* (2013.01); *F21V 9/14* (2013.01); *F21V 9/30* (2018.02); *F21V 14/003* (2013.01); *G01N 21/4795* (2013.01); *G01S 7/497* (2013.01); *G01S 17/04* (2020.01); *G01S 17/10* (2013.01); *G01S 17/89* (2013.01); *G01S 17/931* (2020.01); *G02F 1/0105* (2013.01); *G03B 21/008* (2013.01); *H04N 5/2256* (2013.01); *H04N 5/272* (2013.01); *F21W 2102/20* (2018.01); *F21Y 2115/10* (2016.08); *F21Y 2115/30* (2016.08); *G01J 2003/285* (2013.01)

(58) Field of Classification Search
USPC .............................................. 250/208.1, 216
See application file for complete search history.

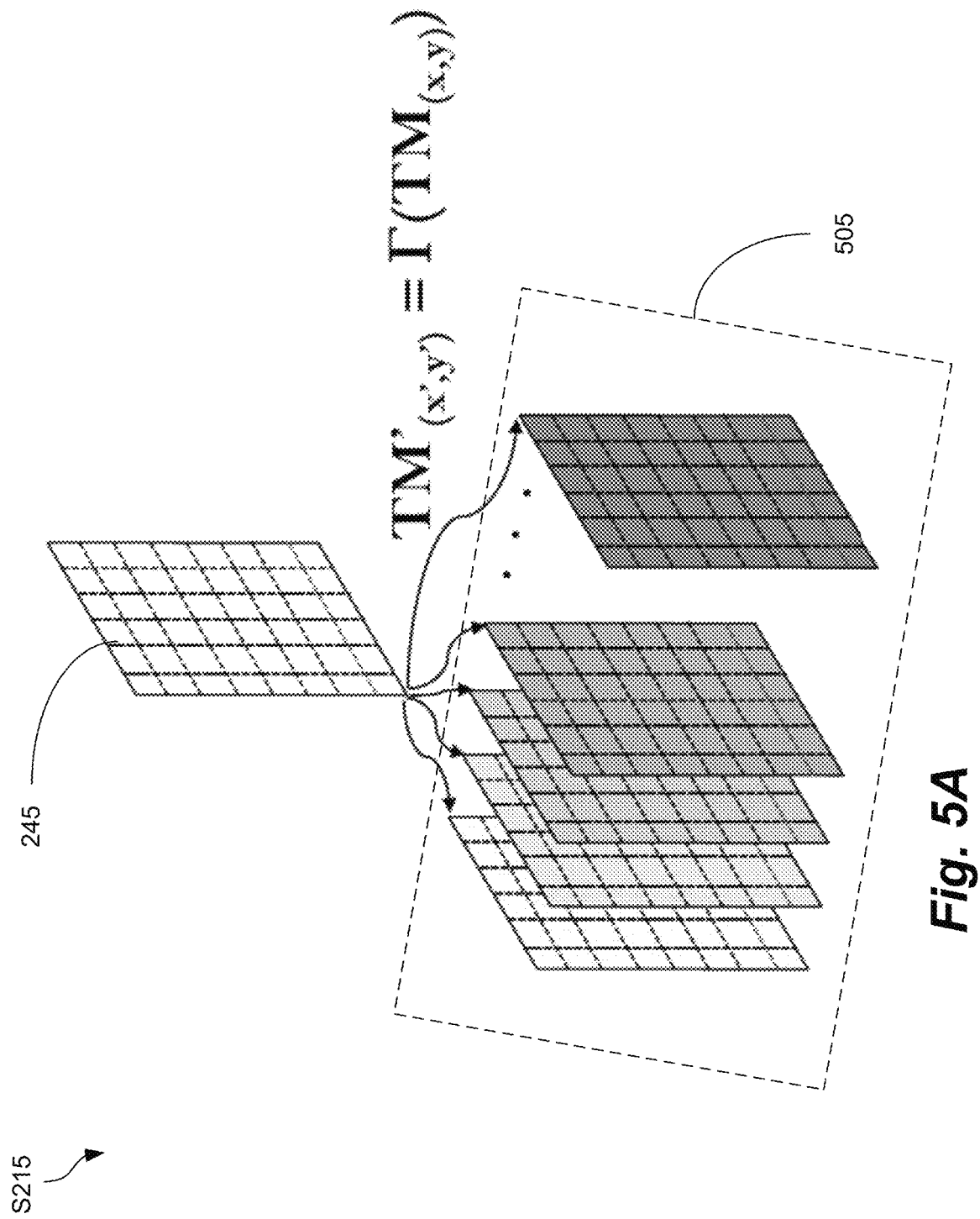

SYSTEM AND METHOD FOR ASSOCIATION ASSISTED ESTABLISHMENT OF SCATTERING CONFIGURATION IN SCATTERING PROCESSING

CROSS-REFERENCE TO RELATED APPLICATION

This application claims the benefit of U.S. Provisional Application No. 62/797,363, filed Jan. 28, 2019, and U.S. Provisional Application No. 62/797,366, filed Jan. 28, 2019, which are incorporated herein by reference in their entirety. Additionally, this application is related to Ser. Nos. 16/708,609, 16/708,641, and PCT/US19/65410, which are incorporated herein by reference in their entirety.

BACKGROUND

A severe scattering medium can cause issues for an image capturing device trying to image a target in or through the severe scattering medium. When evaluating a severe scattering medium (e.g., fog), the evaluation of the scattering medium must be finished within the decorrelation time of the scattering medium. For example, the decorrelation time for fog is about 5 ms. In other words, the decorrelation time describes the amount of time the fog remains unchanged. Accordingly, the time it takes to evaluate the scattering properties of fog must be less than 5 ms. However, because fog moves and changes so quickly, evaluating a scattering medium like fog using traditional methods is impractical.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a system for association-based scattering processing includes a spatial light modulator configured to modulate one or more of phase and amplitude of light irradiated from a light source to a target object. Additionally, the system includes processing circuitry configured to evaluate a field distribution for one localized illumination, induce a set of field distributions for a plurality of localized illuminations based on the field distribution for the one localized illumination, and apply the set of field distributions to the spatial light modulator, scanning a plurality of localized illuminations on the target object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A illustrates induction of optical field for neighboring localized illumination via association among optical fields according to one or more aspects of the disclosed subject matter;

DETAILED DESCRIPTION

Figure 1:
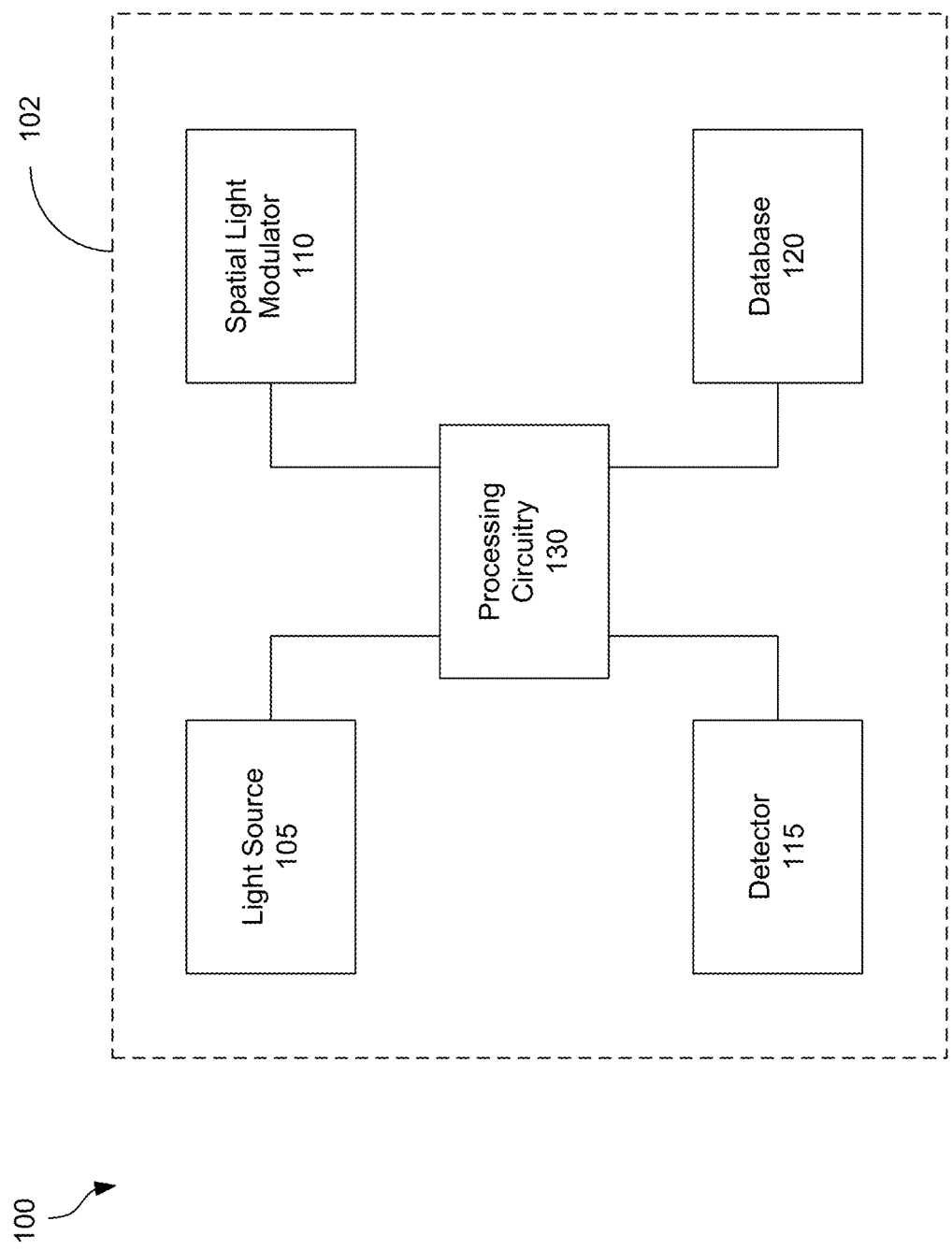
FIG. 1 illustrates an exemplary scattering processing system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

In severe scattering processing, severe scattering mediums can include biological tissue, heavy fog, rain, snow, and the like. In these severe scattering mediums, most of the incident light is scattered, and, as a result, only a small amount of incident light reaches the targets inside (or through) the scattering medium. And, even less light is reflected from the target and detected. As a result, a sensitive detector is needed to capture the direct incident and reflected light, called ballistic light. However, the low signal to noise ratio (SNR) hinders the capability to retrieve the information from the target. Therefore, only shallow depths can be reached inside the scattering medium.

For the light to reach the target deeper inside the scattering medium, there are two ways to increase SNR. A first option is to concentrate the illumination (i.e., focus the light) on the target and scan the localized illuminations on the target. The other is to divert the scattered light back on the targets. The former approach is the manipulation of the ballistic light, while the latter is the modulation of the scattered light.

To make use of the scattered light, the scattering medium is evaluated first, then the incident light can be modulated to divert the scattered light on the target inside or behind the scattering medium. For the fast-varying scattering media, like fog, rain, or biological tissue, decorrelation time is used to describe the time during which the scattering property stays unchanged. In order to divert the scattered light, the evaluation of the scattering medium must be finished within the decorrelation time. The decorrelation time of biological tissue is usually 50-2000 ms, while for fog, it is usually 5 ms. When the scattering medium is evaluated, the output of the optical field after the modulation should be defined beforehand. For example, a required focus at a specific position on the target inside (or through) the scattering medium can be achieved by measuring the output intensities at this position while several spatial modulated incident light inputs are illuminated into the scattering medium. By solving the established equations relating to the inputs and outputs, a matrix which describes the scattering property of the scattering medium can be acquired. Conjugation of the matrix can give the optical field distribution (phase or amplitude), and, when applied on the spatial light modulator, the required focused illumination after the scattering medium can be achieved. The efficiency, or the enhancement of the focused illumination, is proportional to the dimension of the incident modulation (i.e., the number of the modulations on the incident light). A higher number of incident modulation used corresponds to a higher efficiency of the focused illumination that can be achieved, but more time is needed to evaluate the scattering medium. And much more time is needed to evaluate the scattering medium for multiple focused illuminations.

Typically, a Digital Micromirror Device (DMD) is used as the optical field modulator, which has the ability of operating the micromirror currently with 22 kHz, corresponding to 44 µs to display a pattern on it. For an 8×8 incident field modulation and one localized illumination as output, the time to finish the evaluation is about 64×3×44=~8 ms. Here, the "3" stands for three-time interferences from three different reference beams, for example, 0, pi/2, pi, for each input field to calculate the output optical field because the detector (camera) can only record intensity, which is the conjugated square of the output optical field. 44 µs stands for the time needed to display a pattern on DMD. The time to evaluate the 32×32 dimension modulation with one localized illumination output is about 32×32×3×44=~135 ms. For 64×64, it would be 540 ms. To get a focus illumination with a high enhancement, the high dimension incident modulation is needed. Additionally, the evaluation of a high number of focused illuminations is also highly time-consuming. Previously, no approach could be employed to get the required optical fields to achieve the scanning of the focused illuminations on the fast-varying scattering media, such as biological tissues, fog, etc. However, one or more aspects of the disclosed subject matter describe techniques for quickly evaluating the fast-varying scattering media, like fog, to manipulate the scattered light for better imaging of the targets inside the scattering media.

Referring now to the drawings, wherein like reference numerals designate identical or corresponding parts throughout the several views:

FIG. 1 illustrates an exemplary scattering processing system 100 (herein referred to as the system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The system 100 can include a light source 105, a spatial light modulator 110, a detector 115, a database 120, and processing circuitry 130 (which can include internal and/or external memory). In one or more aspects of the disclosed subject matter, the light source 105, the spatial light modulator 110, the detector 115, the database 120, and the processing circuitry 130 can be implemented in an apparatus 102. The apparatus 102 can represent various apparatuses that perform imaging through a scattering medium. For example, the apparatus 102 can be an autonomous vehicle where the headlights can adapt to fog (and/or other scattering media) using the scattering processing system 100. As a result, the autonomous vehicle can more clearly image the road ahead in and through the fog, thus improving the autonomous driving capability in the scattering medium. Additionally, in another embodiment, the apparatus 102 can be an apparatus for real time in vivo imaging through biological tissue, in which the system 100 can overcome the dynamic scattering processing caused by the physiological environment. Further, the aforementioned components can be electrically connected or in electrical or electronic communication with each other as diagrammatically represented by FIG. 1, for example.

Generally speaking, the system 100 can quickly evaluate a fast-varying scattering medium (e.g., fog) to improve visualization in and/or through the fast-varying scattering medium. For example, the system 100 including the light source 105, the spatial light modulator 110, the detector 115, the database 120, and the processing circuitry 130 can be configured to, via the processing circuitry, project, via the light source, illumination based on a predetermined illumination profile. Next, the spatial light modulator can modulate an optical field of the projected illumination based on the illumination profile. Additionally, the detector can detect backscattered illumination corresponding to a first portion of the projected illumination backscattered from a scattering medium and reflected illumination corresponding to a second portion of the projected illumination reflected from a target object located in or through the scattering medium. Finally, the processing circuitry can induce the illumination profile based on one localized illumination, wherein other localized illuminations can be formed at different positions through the scattering medium based on an association relationship among the optical fields for the focused illuminations in or through the scattering medium.

More specifically, to improve the visualization in the case of severe weather conditions, like fog, rain, snow, and/or heavy pollution, the system 100 can quickly establish the overall scattering properties of a scattering medium from a limited knowledge about the scattering medium. The scattering properties can be established based on associations within the scattering processing. For example, by associating transmission matrices in different dimensions of the same system and by associating optical fields in the same dimension of the transmission matrix, the optical localized illuminations and scanning configuration system inside or through the scattering medium can be quickly established.

For example, the system 100 can calculate the transmission matrix of the scattering medium with lower dimension incidence modulation for one focused output (e.g., 8×8 incidence modulations). In this way, the evaluation of the scattering medium can be finished in the shortest amount of time. Next, the system 100 can induce the transmission matrix of a higher incidence dimension by applying an association relationship between the transmission matrices of different dimensions. In this way, the higher dimension transmission matrix describing the scattering media can be obtained without any experimental evaluation processing, which saves a significant amount of time. Additionally, the optical field distribution (phase or amplitude) extracted from the transmission matrix with higher dimension can form localized illuminations with higher enhancement.

Then, the system 100 can induce the optical field (phase or amplitude) distributions forming the focused illuminations at neighboring positions based on the associations of the optical fields corresponding to the focused illuminations for the same dimension of the transmission matrix. Finally, the system 100 can perform fast localized (i.e., focused) scanning with high enhancement quickly enough to image through a fast-changing dynamic scattering medium (e.g., fog).

In other words, instead of experimental evaluations of the scattering medium for larger dimension matrix and multiple focused illuminations, which would take huge amount of time and make it impossible to form the image of the fast evolving medium with confocal configurations, the system 100 uses associations between transmission matrices with different dimension and associations between optical fields distributions to form the localized illuminations in the same dimension of transmission matrix.

The light source 105 can represent one or more light sources in the system 100. In one or more aspects of the disclosed subject matter, the light source 105 can be the headlight of a vehicle. For example, if the apparatus 102 is a vehicle, the system 100 can be configured to modulate the output of the one or more headlights of the vehicle to improve visualization through various scattering media.

The spatial light modulator 110 can represent one or more spatial light modulators in the system 100. A spatial light modulator can modulate the intensity of a light beam. Additionally, a spatial light modulator can modulate the phase or both the phase and amplitude simultaneously. For example, the spatial light modulator 110 can be a Digital Micromirror Device (DMD) which can include a plurality of micromirrors arranged in a matrix. In one or more aspects of the disclosed subject matter, the spatial light modulator 110 can modulate the output of the light source 105.

The detector 115 can represent one or more detectors in the system 100. In one or more aspects of the disclosed subject matter, the detector 115 can be an imaging device. Although other types of detectors can be contemplated, imaging device and detector can be used interchangeably herein. For example, if the apparatus 102 is an autonomous vehicle, the detector 115 can represent one or more imaging devices used for autonomous operation of the vehicle. Accordingly, the system 100 can improve the imaging device's ability to operate in various scattering media.

The database 120 can represent one or more databases in the system 100. The database 120 can be configured to store various information for operation of the system 100. For example, the database 120 can store information for a plurality of transmission matrices, information for phase patterns, and information for phase differences as further described herein. Alternatively, or additionally, the database 120 can represent a memory of the processing circuitry 130, for example.

The processing circuitry 130 can carry out instructions to perform or cause performance of various functions, operations, steps, or processes of the system 100. In other words, the processor/processing circuitry 130 can be configured to receive output from and transmit instructions to the one or more other components in the system 100 to operate the system 100 to improve visualization through various scattering media.

Figure 2:
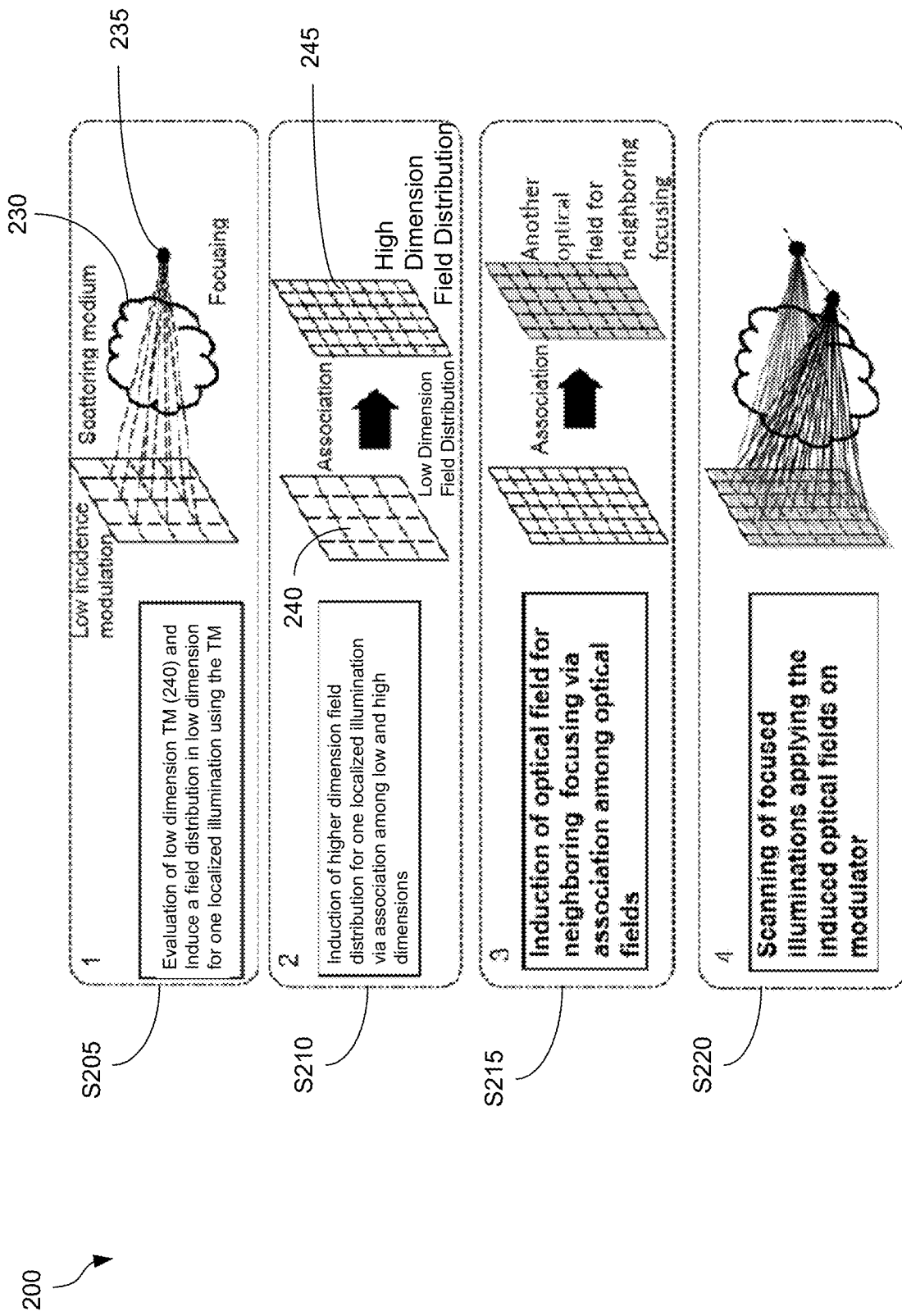
FIG. 2 illustrates an exemplary workflow for association assisted scattering processing according to one or more aspects of the disclosed subject matter.

FIG. 2 illustrates an exemplary workflow 200 for association assisted scattering processing according to one or more aspects of the disclosed subject matter. The associations allow the system 100 to quickly assess the scattering medium for adaptive applications as further described herein.

A direct evaluation of a severe scattering medium (e.g., fog) for high dimension incidence modulation and multiple focusing outputs cannot be accomplished within the decorrelation time. In other words, because a severe scattering medium like fog moves and changes so quickly (i.e., 5 ms decorrelation time), the direct evaluation for high dimension incidence modulation and multiple focusing outputs cannot be completed in less than 5 ms. Accordingly, rather than a direct evaluation of the scattering medium for high dimension incidence modulation and multiple focusing outputs, the system 100 is configured to use an indirect approach which starts with using a low dimension incidence modulation and only one focusing output to evaluate the scattering medium.

Generally, a first step S205 of the workflow 200 includes evaluation of the scattering medium 230 for a low dimension incidence modulation and one focusing output 235. The TM is the relation between the input field distribution (on the modulator) and the output field distribution. The field distribution (phase or amplitude) corresponding to one localized illumination is the conjugation of the corresponding TM. Accordingly, in S205, the system 100 calculates a low dimension transmission matrix (TM) 240 for the scattering medium 230 by using the low dimension incidence modulation. Then, in S205, the system 100 calculates a field distribution in low dimension for only one focusing output 235 using the TM 240. Next, in S210, the system 100 can induce a higher dimension field distribution for one localized illumination based on the low dimension field distribution calculated in S205. The high dimension field distribution can be induced from the low dimension field distribution based on an association relationship among the transmission matrices with different dimensions. In other words, the association relationship can be applied to determine a TM with a high dimension of modulation (e.g., high dimension TM 245).

In S215, the system 100 can induce an optical field for neighboring focusing based on an association among optical fields. Additionally, the optical field distribution with the high dimension of modulation can be used to form a focused illumination with high enhancement. The association relationship among the field distributions corresponding to the focused illuminations can be applied to induce the incident field distributions for the neighboring focused illuminations. Finally, in S220, the system 100 can scan (e.g., received at the detector 115) the focused illuminations by applying the induced optical fields on the modulator. More specifically, by applying the acquired incident optical fields on the spatial light modulator (e.g., spatial light modulator 110), the imaging device (e.g., the detector 115) can received the scanned focused illuminations on the targets and get a confocal image of the target for better visibility. Steps S205, S210, S215, and S220 are described in more detail in FIGS. 3, 4, 5, and 6, respectively.

Figure 3:
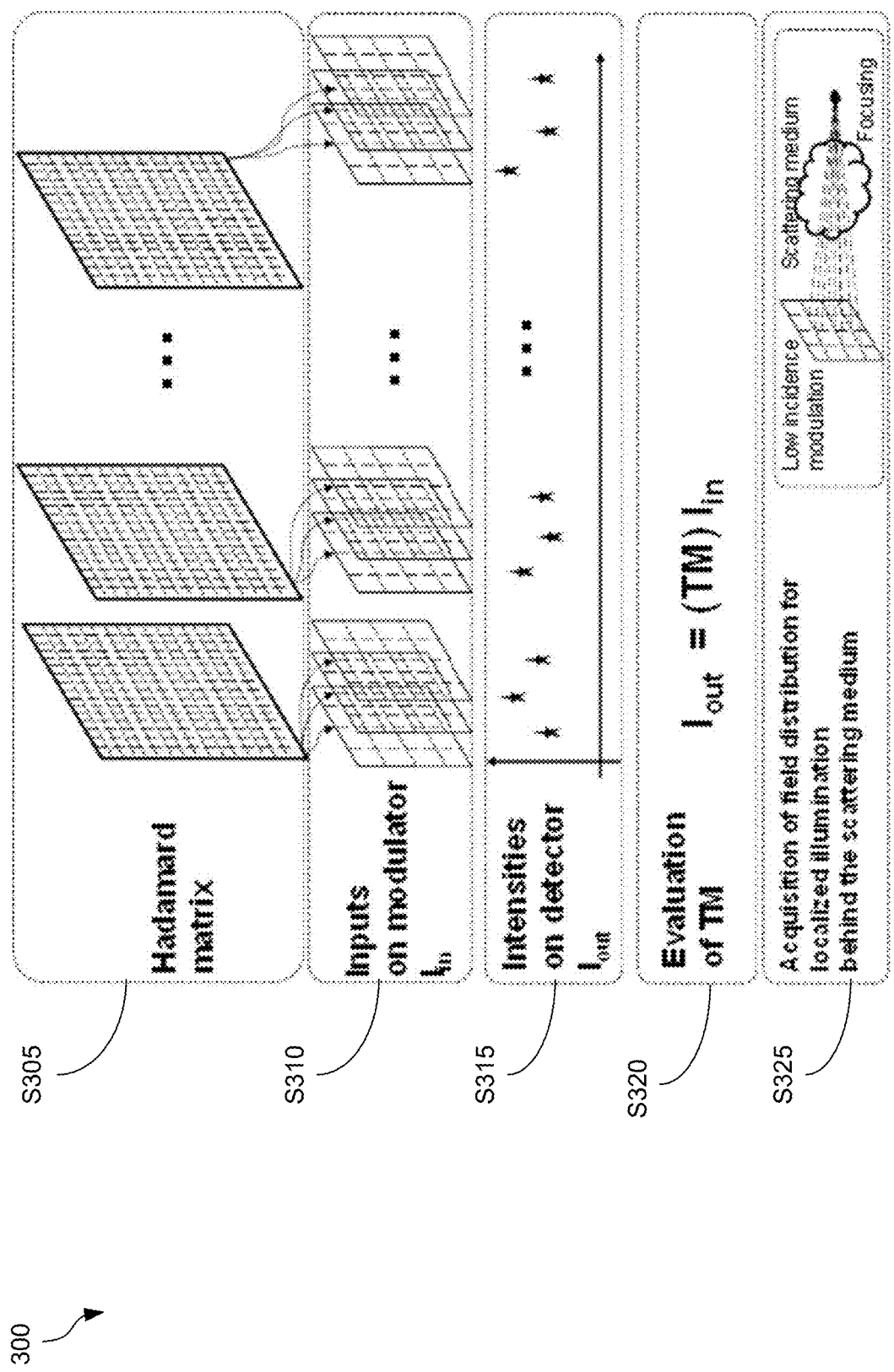
FIG. 3 is an exemplary workflow for evaluating a low dimension transmission matrix for fixed focusing according to one or more aspects of the disclosed subject matter.

FIG. 3 is an exemplary workflow 300 for evaluating a low dimension transmission matrix for fixed focusing (e.g., S205) according to one or more aspects of the disclosed subject matter.

In order to evaluate the scattering medium 230, a transmission matrix can be used to describe the relationship between the input optical field into the scattering medium and the output optical field after the scattering medium. In other words, the random inputs of optical fields can be used to evaluate the transmission matrix. Because the correlated inputs might be used, the number of the inputs are usually higher than the unknown parameters in the transmission matrix. For example, the number of inputs would be higher than MxN for the (M,N) dimension transmission matrix. In order to eliminate the uncertain number of the inputs, a Hadamard matrix can be used (S305). A Hadamard matrix is a matrix where each row is independent and the Hadamard matrix can be used to generate the independent inputs.

Usually, three or four inputs on the modulator (e.g., the spatial light modulator 110) are created by each row in the Hadamard matrix in order to evaluate the transmission matrix of the scattering medium. Therefore, the number of the inputs is more than the number of the row in the Hadamard matrix. As shown in S310, each row in the Hadamard matrix is converted to two-dimension distributions, $I_{in}$, for the realization of the incidence on the modulator. In one aspect, the modulator can be the spatial light modulator 110. Additionally, in one or more aspects of the disclosed subject matter, the modulator can be a digital micromirror device (DMD).

In S5315, for each incidence from the modulator, an intensity value on the detector after the scattering medium is acquired as $I_{out}$ by the detector (e.g., detector 115). After acquiring all the outputs corresponding to the inputs in S5315, the equations to relate the inputs and the outputs can be established regarding the unknown parameters in the transmission matrix as shown in the Equation 1 below.

$$\begin{bmatrix} I_{out_1} \\ I_{out_2} \\ \vdots \\ I_{out_m} \end{bmatrix} = \begin{bmatrix} TM_{11} & TM_{12} & \ldots & TM_{1n} \\ TM_{21} & T_{22} & \ldots & TM_{2n} \\ \vdots & \vdots & \vdots & \vdots \\ TM_{m1} & TM_{m2} & \ldots & TM_{mn} \end{bmatrix} \begin{bmatrix} I_{in_1} \\ I_{in_2} \\ \vdots \\ I_{in_n} \end{bmatrix} \quad \text{(Equation 1)}$$

In S320, the transmission matrix of the scattering medium can be evaluated by solving the above equations. Finally, in S325, field distribution for localized illumination behind the scattering medium can be acquired. More specifically, conjugation of the evaluated two-dimension distribution is the field (phase or amplitude) modulation to form the localized illumination through the scattering medium.

The time spent on each step shown in FIG. 3 can depend on the configuration and the equipment used in the step. Time to generate the Hadamard matrix and formulate the incident modulations for the modulator can be negligible, which can be predefined and managed based on a Field Programmable Gate Array (FPGA). On the other hand, the time to display the incident modulation patterns on the modulator affect the overall operation time due to the large amount of data transferring involved. For example, critical factors needed to establish the base for the evaluation of the required dimension of the transmission matrix include the clock frequency of the modulator, the time to transfer the values on the pixels, the number of pixels of the modulator, and the number of the incident modulations needed. Additionally, the time spent on the detection can be negligible when a fast detector is chosen, and the time for evaluating the TM for solving the equations can also be negligible because parallel calculation is involved in fast operation boards.

Therefore, when the evaluation configurations and the equipment are predefined, the main factor to affect the evaluation time is the number of the incident modulations, which is defined by the dimension of the required transmission matrix. For a lower dimension TM, less time is needed to evaluate the TM. However, the incident field distribution with low dimension acquired from the low dimension TM only generate low enhancement at the localized illumination. Accordingly, after taking advantage of the speed of evaluating a low dimension TM, the associations among the TMs can be applied to induce the higher dimension TMs, for example.

Figure 4:
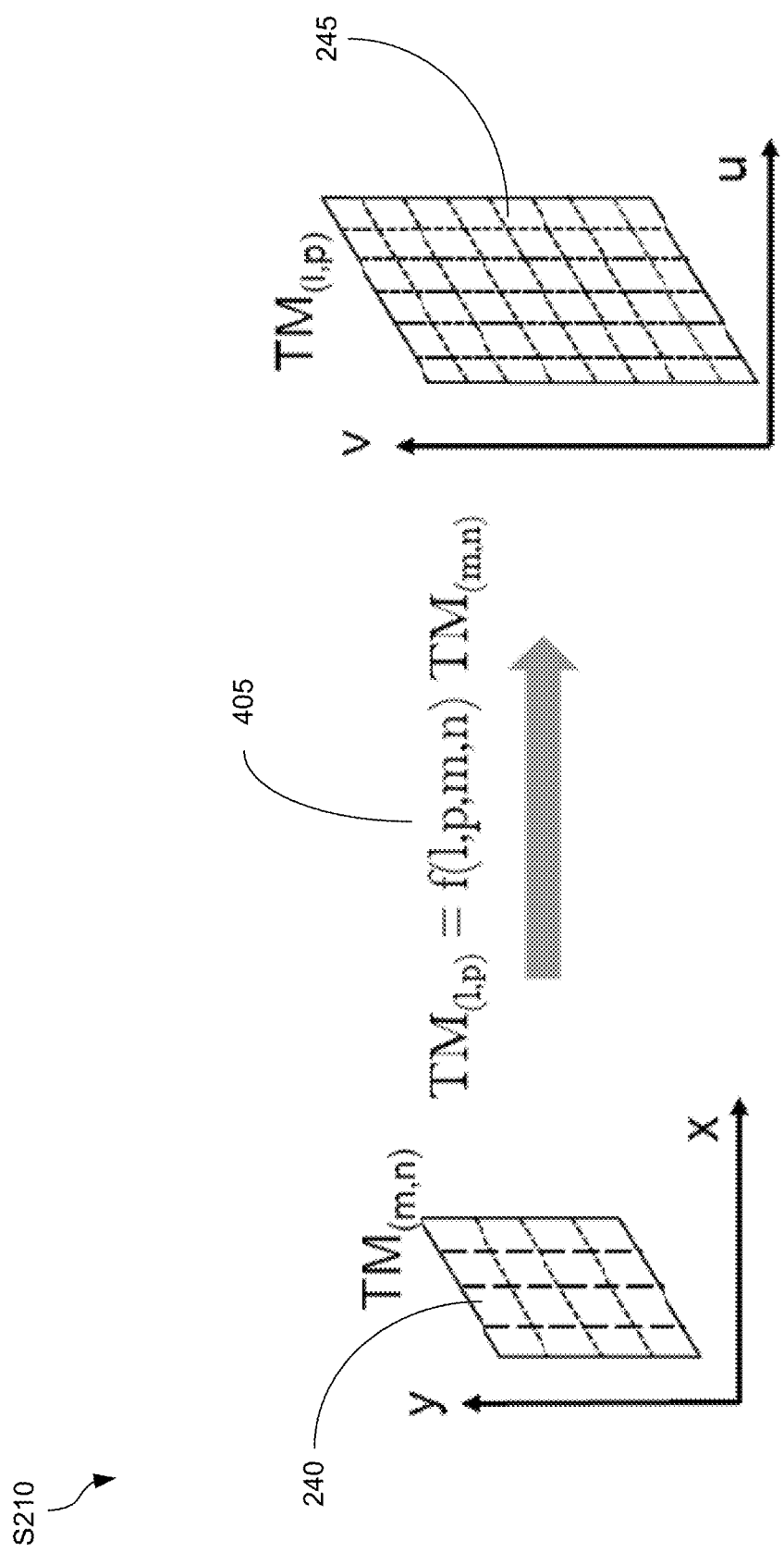
FIG. 4 illustrates induction of higher dimension TMs via association among low and high dimension TMs according to one or more aspects of the disclosed subject matter.

FIG. 4 illustrates induction of higher dimension TMs via association among low and high dimension TMs (e.g., S210) according to one or more aspects of the disclosed subject matter. For example, a relationship 405 (e.g., f(l,p,m,n)) between the low dimension TM 240 (e.g., $TM_{(m,n)}$) and the high dimension TM 245 (e.g., $TM_{(l,p)}$) exists because both TMs describe the same scattering medium (e.g., scattering medium 230). The relationship between the low dimension TM 240 and the high dimension TM 245 (as well as the relationship between the optimized field distributions corresponding to the same localized illumination position) can be established via different approaches. For example, the relationships can be established via neural networks, deep learning, and the like. Once the association (i.e., relationship) is established, the high dimension TM 245 can be induced based on the low dimension TM 240 via the established association between the low dimension TM 240 and the high dimension TM 245. Therefore, a field distribution in high dimension for one localized illumination can be acquired by using the field distribution in low dimension for the localized illumination and the association among low and high dimension TMs.

FIG. 5A illustrates induction of optical fields for neighboring focusing, or localized illuminations, via association among optical fields (e.g., S215) according to one or more aspects of the disclosed subject matter. As has been described herein, for the determined localized illumination position, the high dimension TM is induced from the low dimension TM. By applying the associations among the TMs for different localized illumination positions, as established via calculations as described further herein, the TMs or the spatial field (phase, amplitude) distributions for the neighboring positions can be induced. Additionally, the optical phase distributions among the neighboring illumination positions have global associations, which are distinct from the local relation for the memory effect. The global associations are distinct from the local relation because the global associations refer to the relationship between the phase distributions for the different localized illuminations which is not affected by just local factors like limited displacement or spatial frequency ranges, for example. In other words, "global" can describe that the association relationship is across the scattering medium and not a local effect like the memory effect. Further, global associations exist for the amplitude modulations corresponding to the neighboring localized illumination positions. Accordingly, based on these association relationships, the induced optical field distributions 505 (or the induced TMs) for the different focusing positions can easily be established without any experimental operations, which saves a significant amount of time when establishing the spatial field distributions to scan the target area.

Figure 5B:
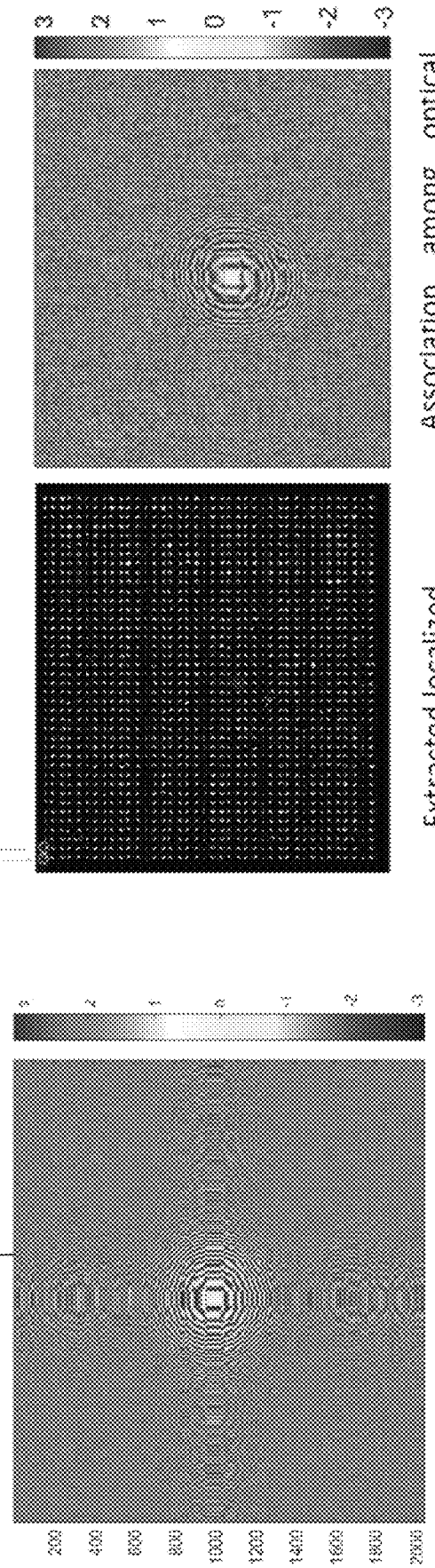
FIG. 5B illustrates exemplary phase associations according to one or more aspects of the disclosed subject matter.
Figure 5C:
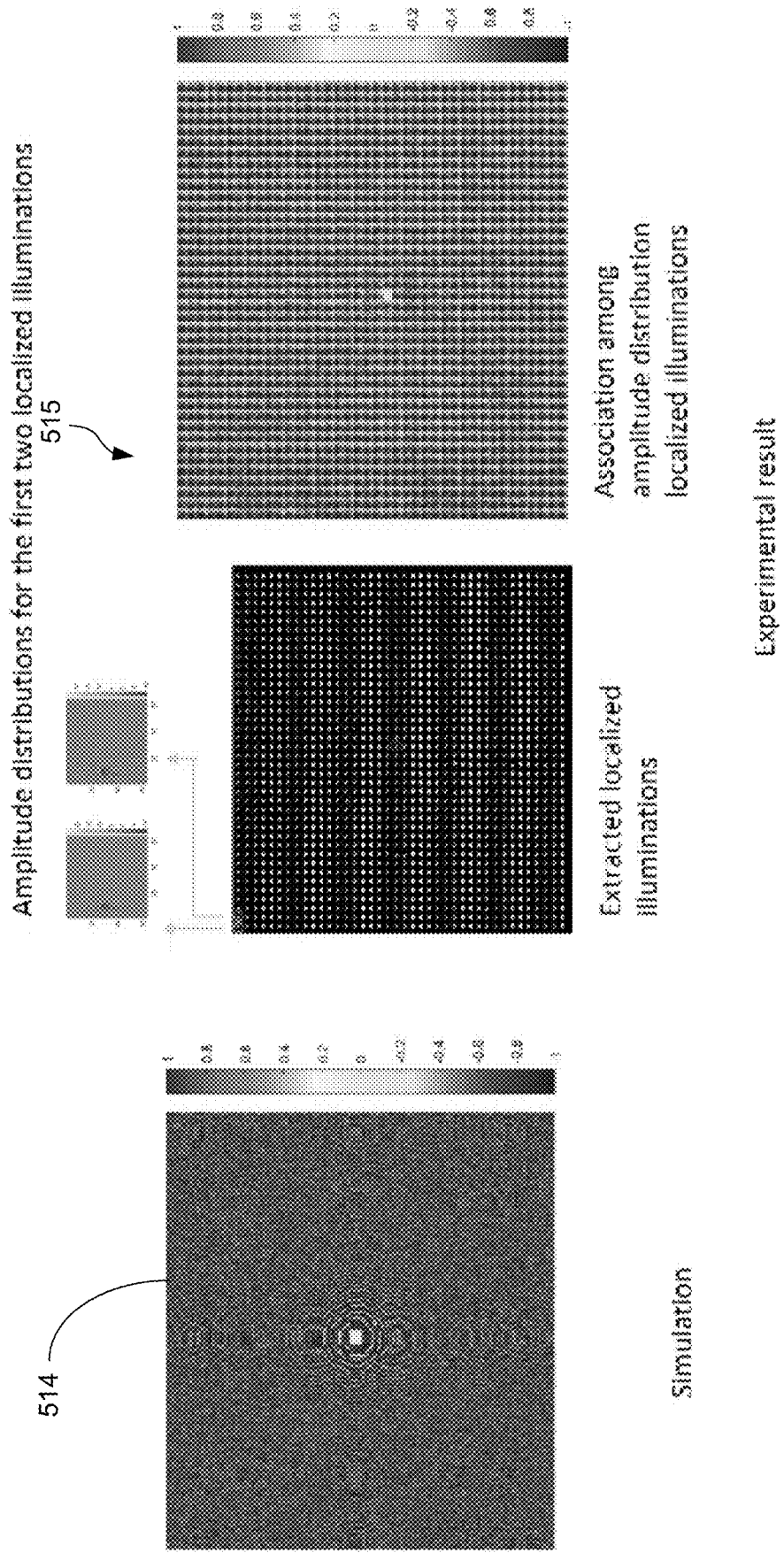
FIG. 5C illustrates exemplary amplitude associations according to one or more aspects of the disclosed subject matter.

FIG. 5B and FIG. 5C illustrate simulation and experimentation supporting phase associations (e.g., associations among phase information between transmission matrices) and amplitude associations, respectively. In summary, by combining the simulation and experimentation results, when using wave front shaping to compensate the diffuse light through a scattering medium to form a localized illumination on a target plane, the phase (or amplitude) information between multiple optimizing transmission matrices is not independent. In fact, it can be represented mathematically. The results show that the phase (or amplitude) difference of different optimizing transmission matrices is global within the area of detection, rather than a local effect, by comparing the intensity of localized illuminations and phase (or amplitude) distribution of optimizing transmission matrices. Further, the results demonstrate that the difference between optimizing transmission matrices and linear phase gradience is relative and can be predicted by equation based on a known starting point of linear phase variance.

FIG. 5B illustrates an exemplary phase comparison by simulation 510 and experimental results 512 according to one or more aspects of the disclosed subject matter. Additionally, the experimental results 512 include extracted localized illuminations and association among optical phase distributions for the localized illuminations. In this example, the extracted localized illuminations are 40×40 localized illuminations formed by employing eigenvectors from TM evaluation. In one aspect, a center can be selected for a 100×100 pixel area on a CCD and concatenated in CCD area, for example. The experimental results 512 also illustrate phase differences among the eigenvectors as optical phases corresponding to the localized illuminations and a reference (e.g., center). In other words, the phase differences can be calculated based on one phase distribution pattern as a reference. In this case, the phase distribution of a center localized illumination is selected as the reference. The value of phase distribution is in a range of $(-\pi, \pi)$ and the phase distribution was found to be periodic. The concentric circles appeared in the phase difference pattern, and the distance between the concentric circles become increasingly thinner farther away from the center.

FIG. 5C illustrates an exemplary amplitude associations 514 and experimental verification 515 according to one or more aspects of the disclosed subject matter. More specifically, the amplitude simulation 514 illustrates that associations exist in the amplitude modulation for the evaluation of TMs of the scattering matrices. The simulation of the associations of the amplitude modulation from a 64×64 transmission matrix shows the difference of the acquired eigenvectors of amplitude regarding the selected localized illumination. Additionally, the experimental results 515 include extracted localized illuminations and association among amplitude distribution for the localized illuminations. The experimental results 515 illustrate experimental verification of the associations among the evaluated eigenvectors of amplitude, acquired from 32×32 transmission matrix by amplitude only wave front shaping experiment.

Figure 5D:
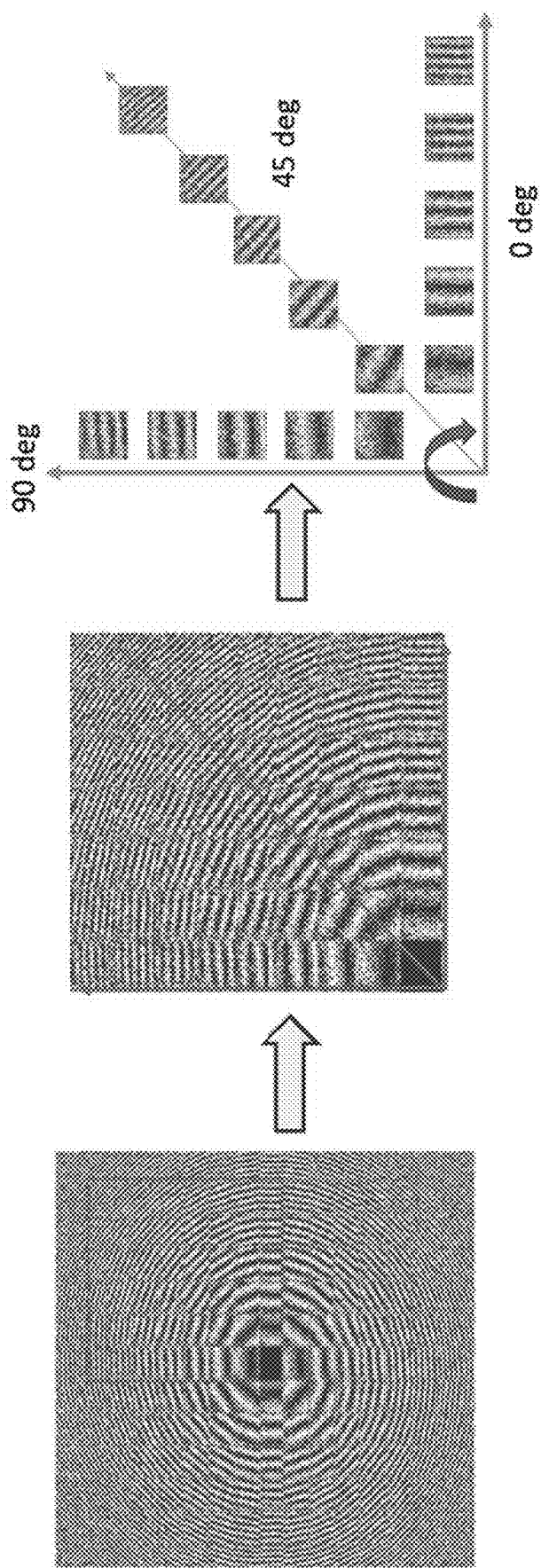
FIG. 5D illustrates the result of analyzing FIG. 5B by binary evolution which ranges from 0 to $\pi$ according to one or more aspects of the disclosed subject matter.

FIG. 5D illustrates the result of analyzing FIG. 5B by binary evolution which ranges from 0 to $\pi$. More specifically, FIG. 5D illustrates the trend of phase stripes for three directions are highly similar as the difference between distances of circles becomes thinner. Though the stripes on the edge are visual illusion that might misguide the result, it is preferably removed by modulating the resolution of screen. The width of phase stripes (distance between phase stripes) decreases in the direction of 0°, 45°, and 90°, respectively. The phase stripes in these three directions are visually similar with the $\pi$ area and 0 area alternate dominates.

Figure 5E:
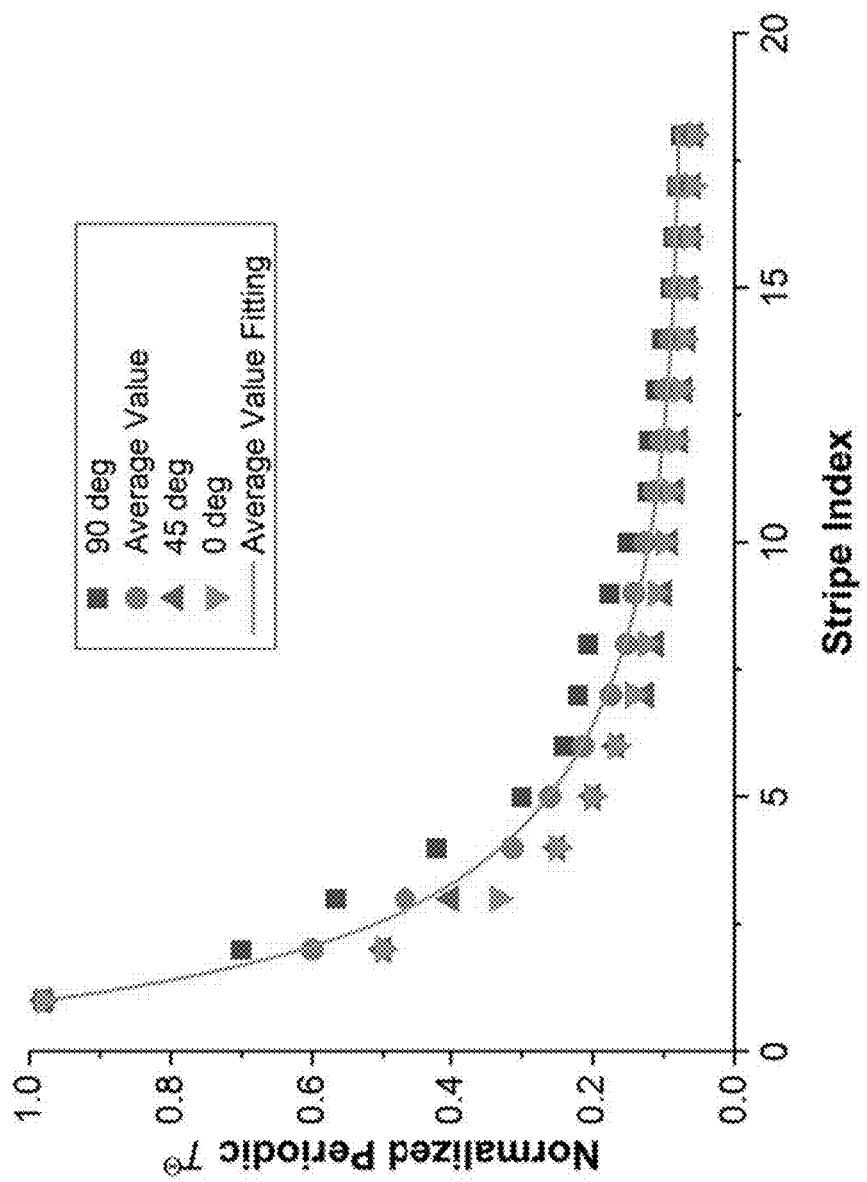
FIG. 5E illustrates a graph showing a periodic like (distance between phase stripes) change of the phase differences for the weak scattering medium according to one or more aspects of the disclosed subject matter.

FIG. 5E illustrates a graph showing a periodic like (distance between phase stripes) change of the phase differences for the weak scattering medium, in which the horizontal axis represents stripe number and the vertical axis represents width of phase stripes. The periodicity of the width of stripes is decreased as summation of two exponential functions in three directions (0°, 45°, and 90°). Approximate curve for the average value of width for three directions is expressed by Equation 2.

$$T_M = 1.351 - e^{(-0.6294M)} + 0.295 - e^{(-0.08412M)} \quad \text{(Equation 2)}$$

M is the order of phase difference pattern and the distance between phase stripes is represented by the number of pixels of phase difference patterns. From the equation, it can be predicted that the periodicity will be saturated.

Based on these association relationships, the field distributions for the different localized illuminations could be easily induced without any experimental operations. The information of these association relationships (phase differences corresponding to the set of field distributions for localized illuminations) are abstracted from a plurality of phase patterns for generating the plurality of localized illuminations at the spatial light modulator and can be measured in advance and stored in memory.

Figure 6:
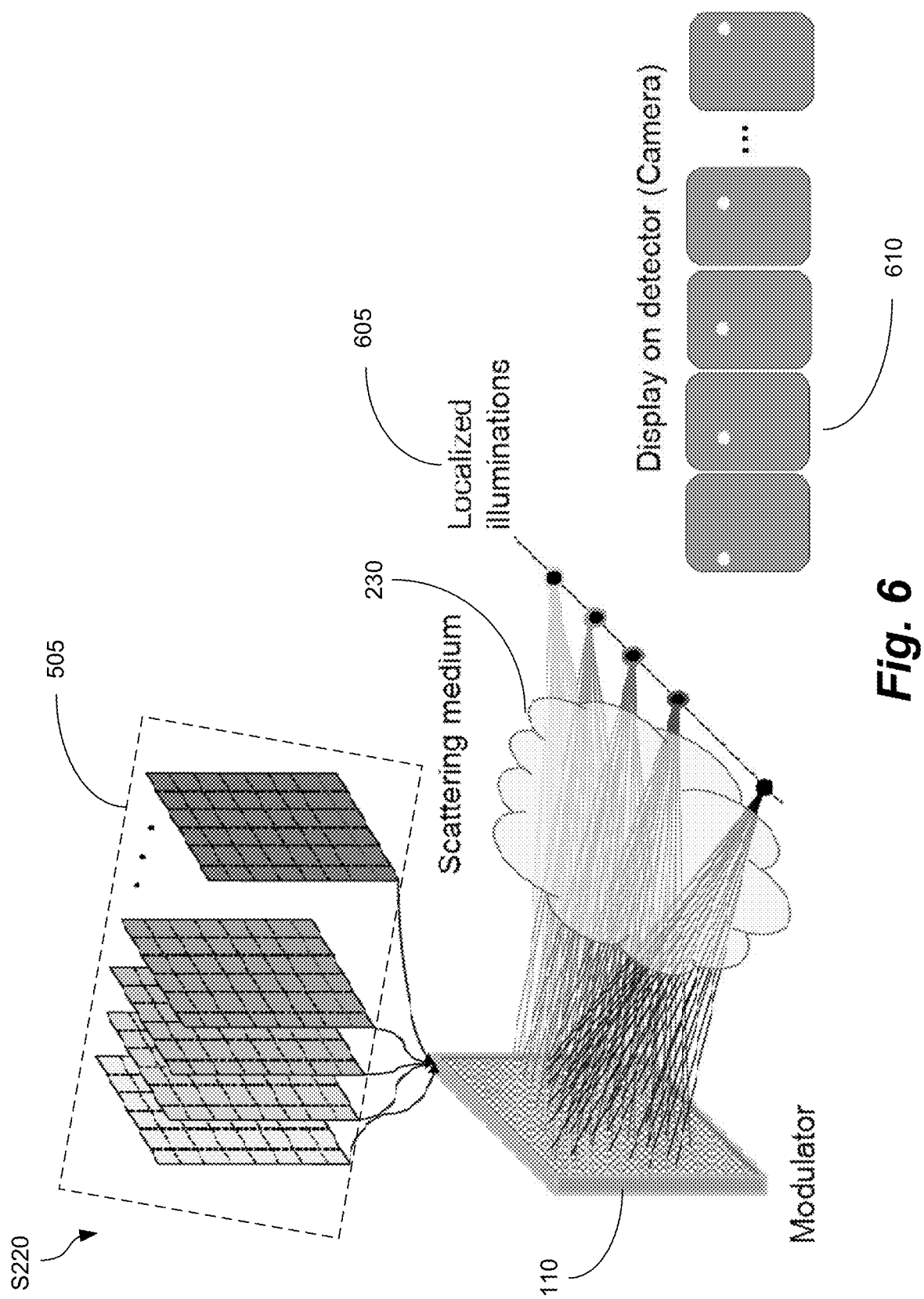
FIG. 6 illustrates scanning of focused illuminations by applying the induced optical fields on the modulator according to one or more aspects of the disclosed subject matter.

FIG. 6 illustrates scanning of localized illuminations by applying the induced optical fields on the modulator according to one or more aspects of the disclosed subject matter. For example, the induced field distributions 505 (or TMs) are displayed on the modulator 110, which modulates the output field to form localized illuminations 605 on the targets as illustrated in a display 610 of the detector 115. The scanning of the localized illuminations 605 can form the two-dimension scan around the initial localized illuminations. The associations of the optical fields 505 (or TMs) from the initial localized illumination show the global relationship, which means for any points away from the initial point, the corresponding field distributions can be induced from the initial field distribution. However, due to the limited spatial resolution of the modulator 110, or the limited size of the pixel area, the induced field distribution for the localized illuminations greater than a predetermined distance from the initial position may not be spatially resolved by the modulator 110. The solution to this issue would be to use the induced field distribution to act as the new initial localized illumination position, and from that point the field distributions corresponding to its neighboring points are generated. This process can be repeated to form the field distributions for all the localized illuminations to scan the entire target area (vertically and/or horizontally). Accordingly, based on the images of the localized illuminations, the image of the target can be formed via the confocal image processing.

Additionally, in another embodiment, the advantages of the one or more aspects of the disclosed subject matter can be adapted for other imaging devices or systems imaging through scattering media. For example, the apparatus 102 can be a confocal imaging system for real time in vivo fluorescent imaging through biological tissue. Accordingly, the dynamic scattering processing caused by the physiological environments such as blood flow, pulse or body liquid, can be overcome by diverting the scattered light back into the target for high contrast images. The nature of the spatial modulation of the scattering has the capability to form diffraction limited focus. Therefore, the system 100 can be used to form super resolution fluorescent images. Particularly, phase conjugation with a FPGA program can be employed to retrieve the optical phase through the biological tissue within 3 ms. Similarly, using the phase conjugation to capture the optical phase (or TM) for a focused illumination can achieve the speed required to evaluate the scattering processing of a fast-varying scattering medium like fog, which can make use of the scattering by the fog to significantly improve the visualization through the fog and revolutionize the lighting design industry.

Figure 7A:
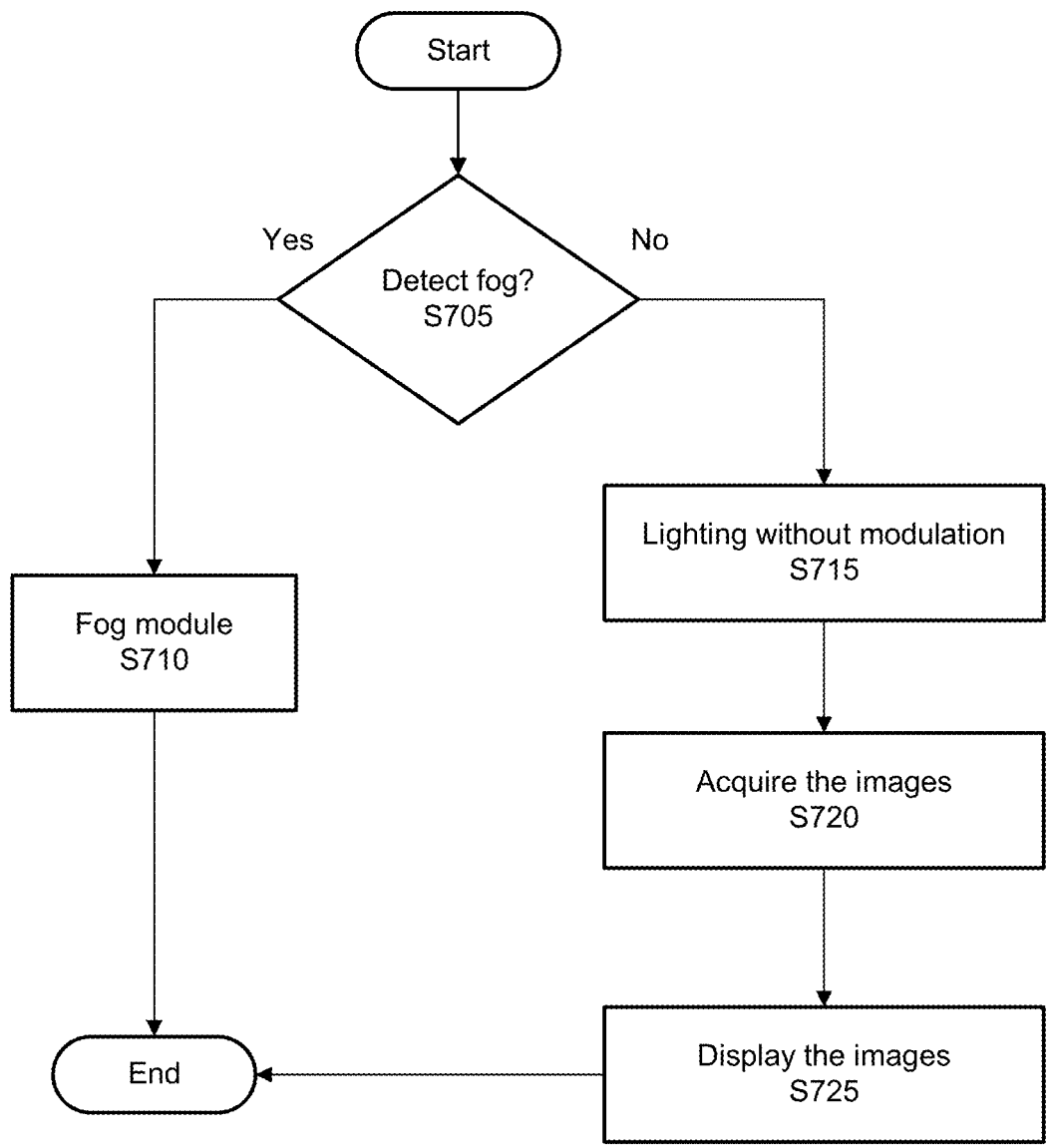
FIG. 7A is an algorithmic flow chart of method for imaging a target object in different conditions according to one or more aspects of the disclosed subject matter.

FIG. 7A is an algorithmic flow chart of method for imaging a target object in different conditions according to one or more aspects of the disclosed subject matter.

In S705, it can be determined if the system 100 detects a scattering medium. For example, the system 100 may detect that a vehicle is approaching or traveling through a scattering medium. For the following description, the scatter medium can be fog. However, it should be appreciated that the process can be applied to any scattering medium that has been mentioned herein. In one aspect, the imaging device (i.e., the detector 115) can detect a presence of the fog based on a decrease in visibility. Alternatively, or additionally, a foggy area may have been identified (e.g., crowd-sourced data, weather data, etc.) and the process may be triggered when a location of the vehicle (e.g., identified via GPS) enters or is in the identified foggy area. In response to fog not being detected, the process can proceed to a standard imaging process. For example, the standard imaging processing can include lighting without modulation (S715). In other words, the light source doesn't need to be modulated to image a target object when there is no fog. Next, the detector 115 can acquire the images (S720), and the images can be displayed (and/or used for autonomous driving operations, for example) in S725. After the images are displayed in S725, the process can end. However, in response to fog being detected, the system 100 can image a target object through a scattering medium (e.g., fog) based on a fog module in S710. The target object can be an object in or through the fog. For example, in one aspect, the apparatus 102 can be a vehicle and the object in or through the fog can be an object relevant to vehicle operation (e.g., another vehicle, a street sign, lane lines, etc.). The operation of the fog module in S710 is further described in FIG. 7B.

Figure 7B:
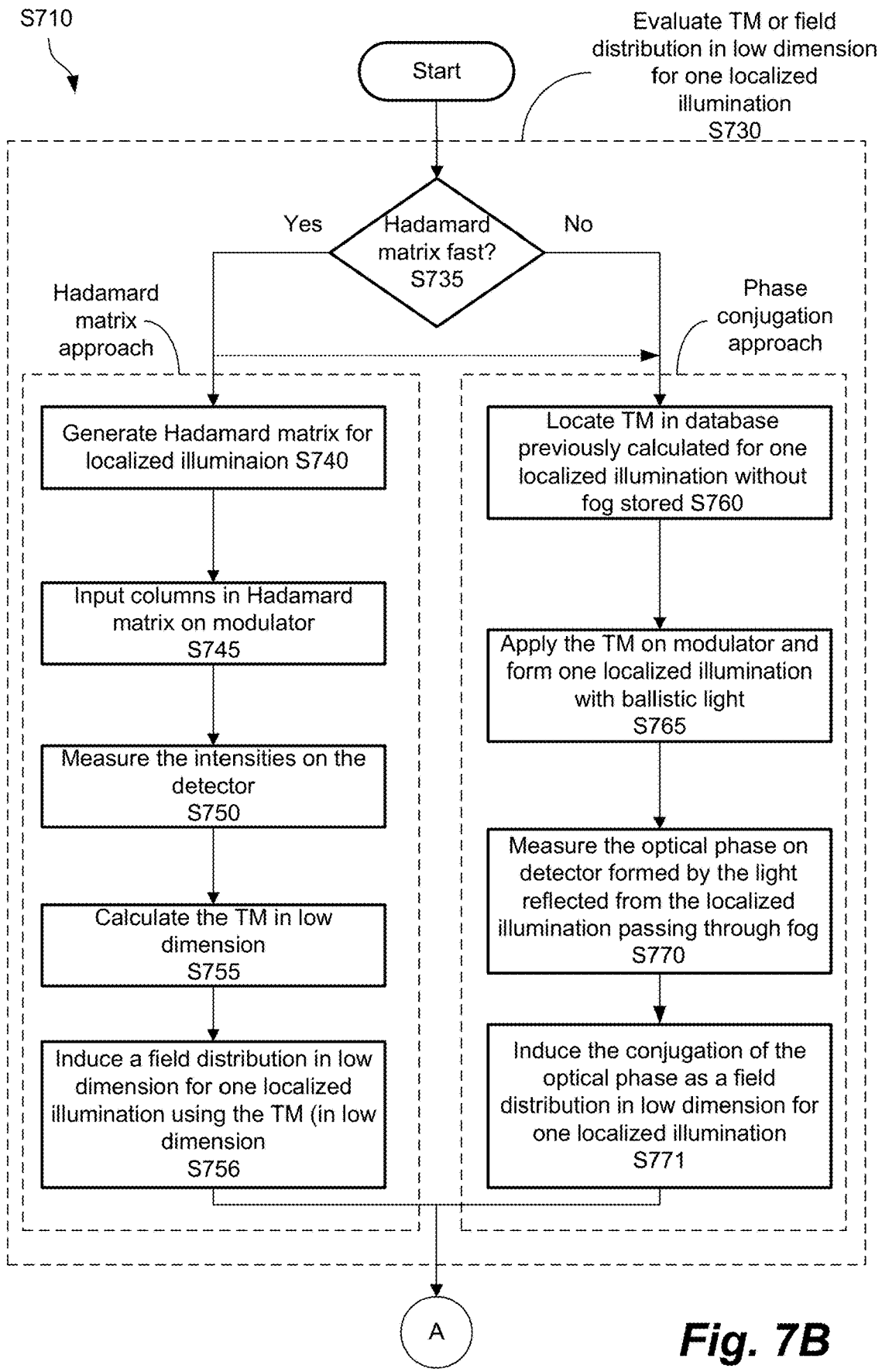
FIG. 7B is an algorithmic flow chart of a method for imaging a target object through a scattering medium according to one or more aspects of the disclosed subject matter.

FIG. 7B is an algorithmic flow chart of a method for imaging a target object through a scattering medium according to one or more aspects of the disclosed subject matter.

In S730, the system 100 (e.g., via the processing circuitry 130) can evaluate a transmission matrix (TM) or field distribution in low dimension for one localized illumination. Evaluating the TM or field distribution in low dimension for one localized illumination can be accomplished using the Hadamard matrix approach or the phase conjugation approach. Steps S735-S770 further describe the evaluation of the TM or field distribution in low dimension for one localized illumination in S730.

In S735, the processing circuitry 130 can determine if the Hadamard matrix approach is fast. For example, it can be determined if the Hadamard matrix approach can be calculated faster than a predetermined threshold. In other words, it can be determined if the Hadamard matrix approach can be fast enough to calculate the TM in low dimension for one localized illumination faster than the decorrelation time while still leaving enough time for the association technique. For example, if the Hadamard matrix approach can calculate the TM in low dimension for one localized illumination in 1 ms, then the association technique further described herein to image a target object through fog can be performed within the decorrelation time of fog (e.g., within 5 ms). If the Hadamard matrix approach is fast (i.e., meets the predetermined threshold for the scattering medium), the process can continue to the Hadamard matrix approach (S740-S755). Although the Hadamard matrix approach needs to be fast to continue to the transmission matrix evaluation in this example, it should be appreciated that when the Hadamard matrix approach is fast, the process can also continue to the phase conjugation approach (S760-S770). However, if the Hadamard matrix is not fast in S735 (i.e., does not meet the predetermined threshold for the scattering medium), the process can continue to the phase conjugation approach (S760-S770).

In S740, in the Hadamard matrix approach, the processing circuitry 130 can generate a Hadamard matrix for the one localized illumination.

In S745, the processing circuitry 130 can input columns of the Hadamard matrix on a modulator (e.g., the modulator 110).

In S750, the processing circuitry 130 can measure the intensities on the detector 115.

In S755, the processing circuitry 130 can calculate the TM in low dimension for one localized illumination based on the measured intensities. It should be appreciated that steps S740-S755 are similarly described in FIG. 3 in more detail.

After the calculating the TM in S755, the process can continue to induce TM or field distributions in high dimension for the one localized illumination in S775.

Referring back to when it is determined that the Hadamard matrix approach is not fast in S735, the process continues with the phase conjugation approach. In S760, the processing circuitry 130 can locate a TM in a database (e.g., database 120). The TM stored in the database 120 can have been calculated previously for one localized illumination without fog, for example. In one aspect, the database 120 can store information corresponding to a plurality of transmission matrixes where each transmission matrix indicates a linear input/output response to each scattering medium of a plurality of scattering mediums. Additionally, the database 120 can store information regarding phase patterns at the spatial light modulator for generating all of the plurality of localized illuminations. The database 120 can also store information of phase difference at the spatial light modulator where the phase difference can be determined between a standard phase pattern for generating one of the plurality of localized illuminations and other phase patterns for generating neighboring localized illuminations.

In S765, the processing circuitry 130 can apply the TM on the modulator 110 and form one localized illumination with ballistic light.

In S770, the detector 115 can measure the optical phase (i.e., transmission matrix) formed by the light reflected from the one localized illumination passing through the fog. In S771, the processing circuitry 130 can induce the conjugation of the optical phase, as a field distribution in low dimension for one localized illumination. Then, the processing circuitry 130 can induce a field distribution in high dimension for the one localized illumination in S775.

In S775, the processing circuitry 130 can induce TM or field distribution in high dimension for the one localized illumination by using the field distribution in low dimension for the one localized illumination.

In S780, the processing circuitry 130 can induce field distributions (phase or amplitude) in high dimension for a set of localized illuminations based on the induced field distribution for the one localized illumination in S775. More specifically, the field distributions for the set of localized illuminations can be based on an association relationship among the field distributions as has been further described herein. For example, the neighboring localized illuminations can be induced based on the one localized illumination in high dimension induced in S775. In other words, in one aspect, the phase patterns for other localized illuminations of light neighboring the one localized illumination can be induced such that the phase patterns for the neighboring localized illuminations can be identified. Additionally, when the phase patterns are induced, the processing circuitry 130 can further calculate the phase patterns based on a periodical or non-periodical phase difference between phase patterns of mutually adjacent localized illuminations. Additionally, in one aspect, the phase patterns can be abstracted from a plurality of phase patterns for generating the plurality of localized illuminations at the spatial light modulator. In other words, the one localized illumination can be a starting point and the calculation can be repeated to calculate the rest of the phase patterns to identify the other neighboring localized illuminations.

In S785, the processing circuitry 130 can apply field distributions on the modulator, scanning the plurality of the focused points on the target object. In other words, the processing circuitry 130 can drive modulator 110 via modulation signals for irradiating patterns for generating a plurality of localized illuminations from the light source 105 arranged in a matrix on the target object.

In S790, the processing circuitry 130 can detect the images (e.g., via the detector 115) of the plurality of localized illuminations of the target object based on the scanning in S785. The processing circuitry 130 can further process the detected images to acquire a confocal image of the target object. After acquiring the confocal image of the target object, the process can end.

The system 100 can include several advantages. For example, the overall scattering properties of the scattering medium can be established via a limited knowledge on the scattering processing. For example, an association relationship in scattering processing can be employed to acquire the optical field distribution to manipulate the scattered light. Additionally, both optical phase and amplitude can be individually induced from the associations. The complex amplitude, which is composed of its phase and amplitude, can also be induced from the optical field association to manipulate the scattered light. As a result, the association of the optical fields can be employed to reveal the scattering property of the scattering medium.

Figure 7B:
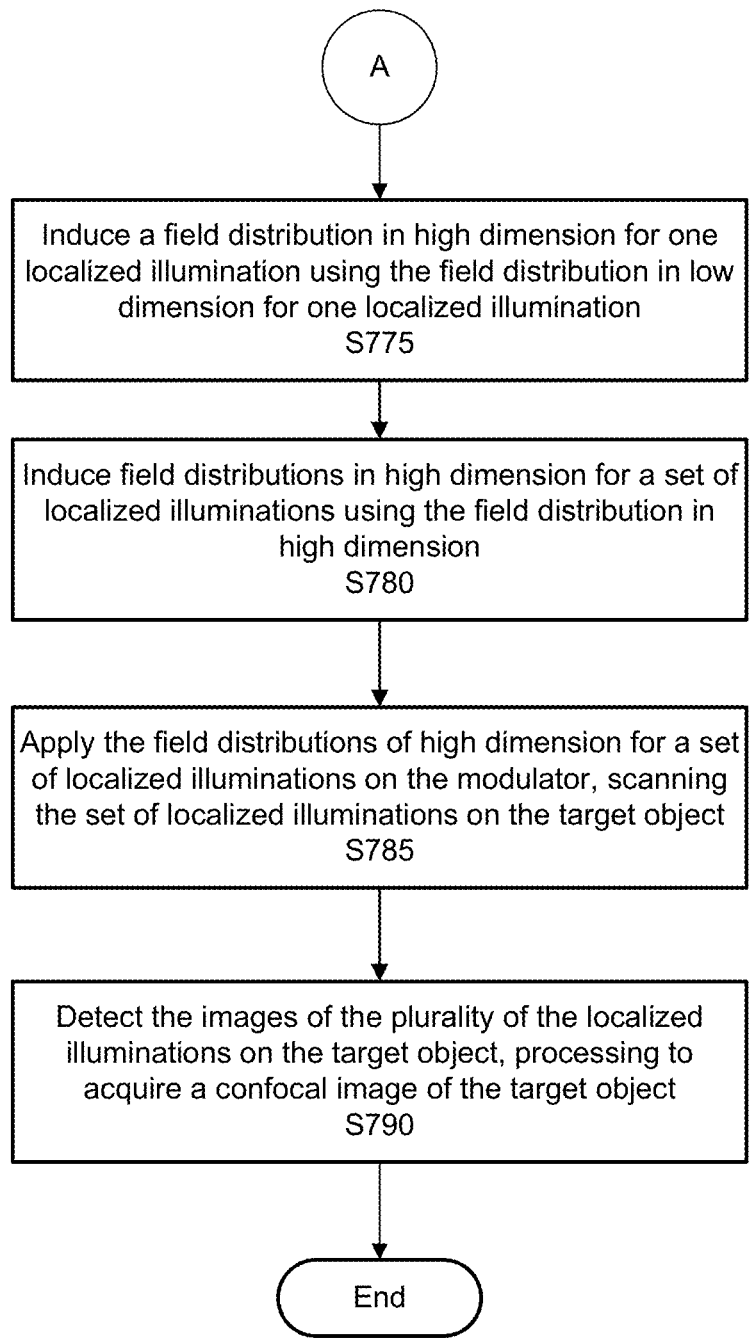

In the above description of FIGS. 2, 3, and 7, any processes, descriptions or blocks in flowcharts and workflows can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another or may be combined in various ways. All possible combinations and sub-combinations are intended to fall within the scope of this disclosure.

Figure 8:
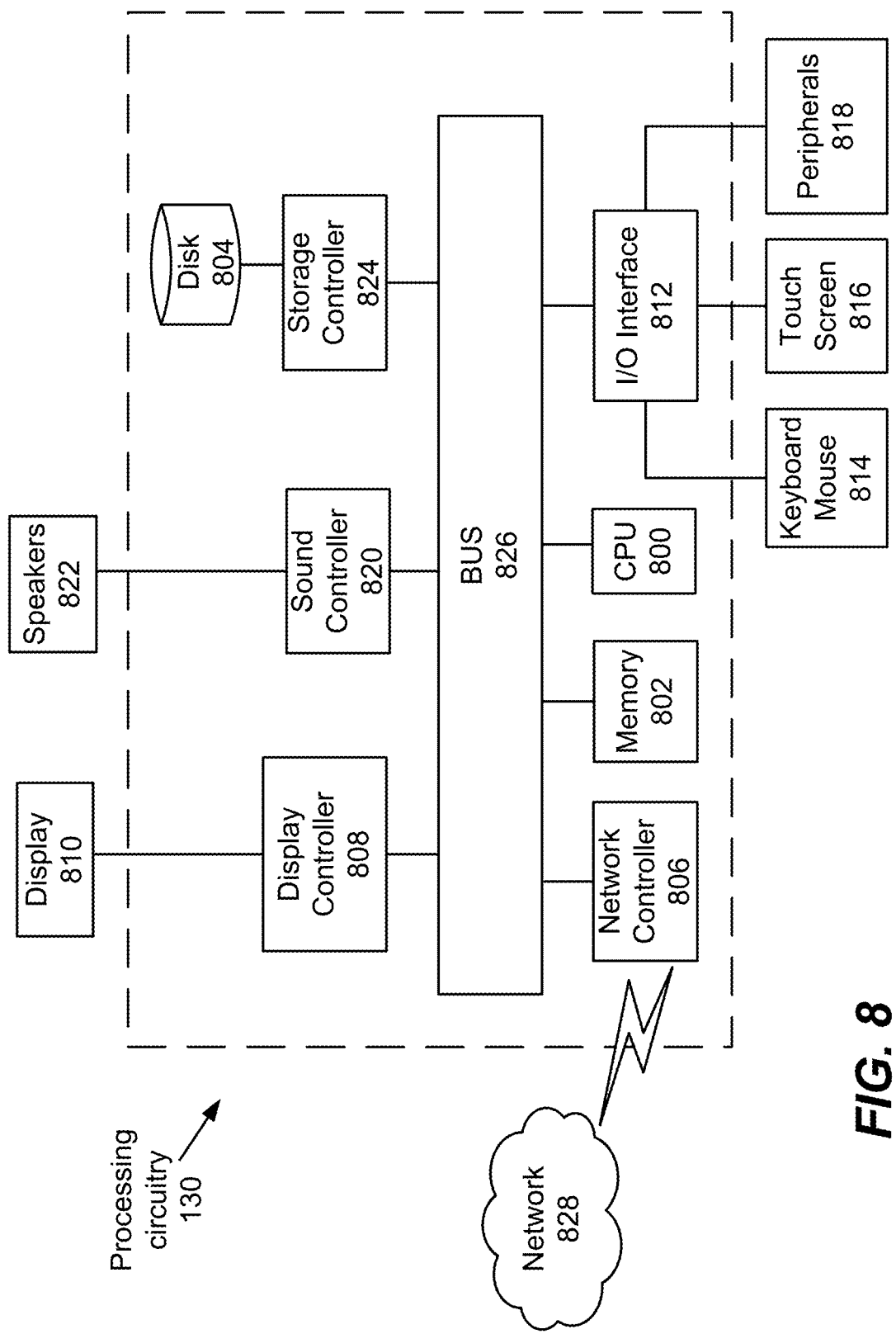
FIG. 8 is a hardware block diagram of a server according to one or more exemplary aspects of the disclosed subject matter.

Next, a hardware description of a computer/device according to exemplary embodiments is described with reference to FIG. 8. The hardware description described herein can be a hardware description of the processing circuitry 130, for example. In FIG. 8, the processing circuitry 130 includes a CPU 800 which performs one or more of the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 130 communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the processing circuitry 130 may be realized by various circuitry elements. Further, each of the functions of the above described embodiments may be implemented by circuitry, which includes one or more processing circuits. A processing circuit includes a particularly programmed processor, for example, processor (CPU) 800, as shown in FIG. 8. A processing circuit also includes devices such as an application specific integrated circuit (ASIC) and conventional circuit components arranged to perform the recited functions.

In FIG. 8, the processing circuitry 130 includes a CPU 800 which performs the processes described above. The processing circuitry 130 may be a general-purpose computer or a particular, special-purpose machine. In one embodiment, the processing circuitry 130 becomes a particular, special-purpose machine when the processor 800 is programmed to perform association assisted establishment of scattering configuration in scattering processing (and in particular, any of the processes discussed with reference to FIGS. 2, 3, and 7).

Alternatively, or additionally, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The processing circuitry 130 in FIG. 8 also includes a network controller 806, such as an Intel Ethernet PRO network interface card from Intel Corporation of America, for interfacing with network 828. As can be appreciated, the network 828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing circuitry 130 further includes a display controller 808, such as a graphics card or graphics adaptor for interfacing with display 810, such as a monitor. A general purpose I/O interface 812 interfaces with a keyboard and/or mouse 814 as well as a touch screen panel 816 on or separate from display 810. General purpose I/O interface also connects to a variety of peripherals 818 including printers and scanners.

A sound controller 820 is also provided in the processing circuitry 130 to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the processing circuitry 130. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system, comprising:
   a spatial light modulator configured to modulate one or more of phase and amplitude of light irradiated from a light source to a target object; and
   processing circuitry configured to
   evaluate a field distribution for one localized illumination,
   induce a set of field distributions for a plurality of localized illuminations based on the field distribution for the one localized illumination, and
   apply the set of field distributions to the spatial light modulator, scanning a plurality of localized illuminations on the target object.

2. The system of claim 1, wherein the processing circuitry is further configured to
   induce the field distribution from low dimension to high dimension for the one localized illumination.

3. The system of claim 1, wherein the processing circuitry is further configured to
   detect an image for each of the plurality of the localized illuminations on the target object, wherein the images are processed to acquire a confocal image of the target object.

4. The system of claim 1, wherein the processing circuitry for evaluating the field distribution for the one localized illumination is further configured to
   determine whether a Hadamard matrix approach satisfies a predetermined threshold required for calculating the field distribution for the one localized illumination, and
   calculate the field distribution for the one localized illumination in response to the Hadamard matrix approach satisfying the predetermined threshold.

5. The system of claim 1, wherein periodical phase differences corresponding to the set of field distributions are abstracted from a plurality of phase patterns for generating the plurality of localized illuminations at the spatial light modulator.

6. The system of claim 1, further comprising:
a memory configured to store information including a plurality of field distributions where each field distribution indicates a linear input/output response to each scattering medium of a plurality of scattering mediums, phase patterns at the spatial light modulator for generating all of the plurality of localized illuminations, phase difference at the spatial light modulator where the phase difference can be determined between a standard phase pattern for generating one of the plurality of localized illuminations, and other phase patterns for generating neighboring localized illuminations.

7. The system of claim 4, wherein the processing circuitry for calculating the field distribution for one localized illumination is further configured to
generate a Hadamard matrix,
input columns from the Hadamard matrix on the spatial light modulator,
measure intensities on the detector corresponding to the input on the spatial light modulator, and
calculate the field distribution for the one localized illumination based on the measured intensities.

8. The system of claim 1, wherein the processing circuitry is further configured to
calculate a phase or amplitude pattern based on the field distribution for the one localized illumination, and
induce a set of phase or amplitude patterns based on the calculated phase or amplitude pattern.

9. The system of claim 8, wherein in response to inducing the phase and amplitude patterns based on the calculated phase pattern, the processing circuitry is further configured to
calculate one of the phase or amplitude patterns corresponding to a neighboring localized illumination which is adjacent to the one localized illumination.

10. The system of claim 1, wherein one of the plurality of localized illuminations is located in a center of the plurality of localized illuminations arranged on the target object.

11. The system of claim 1, wherein the spatial light modulator is a Digital Micromirror Device (DMD) including a plurality of micromirrors arranged in a matrix.

12. The system of claim 1, further comprising:
an imaging device configured to generate image data by capturing an image of the target object through a scattering medium.

13. A method for generating a modulation signal for scattering processing, comprising:
evaluating a field distribution for one localized illumination;
inducing a set of field distributions for a plurality of localized illuminations based on the field distribution for the one localized illumination; and
applying the set of field distributions to the spatial light modulator, scanning a plurality of localized illuminations on the target object.

14. The method of claim 13, further comprising:
inducing the field distribution from low dimension to high dimension for the one localized illumination.

15. The method of claim 13, further comprising:
detect an image for each of the plurality of the localized illuminations on the target object, wherein the images are processed to acquire a confocal image of the target object.

16. The method of claim 13, further comprising:
determining whether a Hadamard matrix approach satisfies a predetermined threshold required for calculating the field distribution for the one localized illumination; and
calculating the field distribution for the one localized illumination in response to the Hadamard matrix approach satisfying the predetermined threshold.

17. The method of claim 16, wherein calculating the field distribution for the one localized illumination further comprises:
generating a Hadamard matrix;
inputting columns from the Hadamard matrix on the spatial light modulator;
measuring intensities on the detector corresponding to the input on the spatial light modulator; and
calculating the field distribution for the one localized illumination based on the measured intensities.

18. The method of claim 13, wherein one of the plurality of localized illuminations is located in a center of the plurality of localized illuminations arranged on the target object.

19. The method of claim 13, wherein periodical phase differences between phase patterns corresponding to the set of field distributions are abstracted from a plurality of phase patterns for generating the plurality of localized illuminations at the spatial light modulator.

20. A system, comprising:
a light source;
a spatial light modulator;
a detector; and
processing circuitry configured to
project, via the light source, illumination based on a predetermined illumination profile,
modulate, via the spatial light modulator, an optical field of the projected illumination based on the illumination profile,
detect, via the detector, backscattered illumination corresponding to a first portion of the projected illumination backscattered from a scattering medium,
detect, via the detector, reflected illumination corresponding to a second portion of the projected illumination reflected from a target object located in or through the scattering medium, and
induce the illumination profile based on one localized illumination, wherein other localized illuminations can be formed at different positions through the scattering medium based on an association relationship among the optical fields for the localized illuminations in or through the scattering medium.

* * * * *